US012559047B2

(12) United States Patent
Bharathan et al.

(10) Patent No.: US 12,559,047 B2
(45) Date of Patent: Feb. 24, 2026

(54) SHROUDS FOR STOWABLE STEERING COLUMNS

(71) Applicant: Ford Global Technologies, LLC, Dearborn, MI (US)

(72) Inventors: Kalyanaraman Bharathan, Canton, MI (US); Tim Ray Beard, St. Clair Shores, MI (US); Thomas Junior Luckett, Saline, MI (US); Paul Cepeda, Mexico City (MX); Alma Elisa Lopez Rayon, Puebla (MX); Benjamin John Keur, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 593 days.

(21) Appl. No.: 18/153,197

(22) Filed: Jan. 11, 2023

(65) Prior Publication Data

US 2024/0227695 A1      Jul. 11, 2024

(51) Int. Cl.
B60R 13/02 (2006.01)
B62D 1/183 (2006.01)

(52) U.S. Cl.
CPC .............. B60R 13/02 (2013.01); B62D 1/183 (2013.01)

(58) Field of Classification Search
CPC ............ B60R 13/02; B60R 2013/0281; B60R 2013/0293; B62D 1/18; B62D 1/183; B62D 1/185

USPC ........................................................ 296/1.08
See application file for complete search history.

(56) References Cited

U.S. PATENT DOCUMENTS

| | | | |
|---|---|---|---|
| 9,145,162 B2 | 9/2015 | Butler et al. | |
| 9,630,644 B2 | 4/2017 | Soderlind | |
| 10,442,455 B2 | 10/2019 | McKinzie et al. | |
| 11,845,486 B2 * | 12/2023 | Kremer | ................... B62D 1/185 |
| 2009/0158880 A1 * | 6/2009 | Myers | ..................... B62D 1/16 |
| | | | 74/492 |
| 2016/0355145 A1 * | 12/2016 | Forth | .................... B60W 10/06 |
| 2017/0253263 A1 * | 9/2017 | Iyanagi | .................. B62D 1/187 |
| 2019/0092371 A1 | 3/2019 | Messing et al. | |
| 2019/0283794 A1 * | 9/2019 | Nagai | .................... B62D 1/195 |
| 2020/0189646 A1 | 6/2020 | Davies et al. | |

FOREIGN PATENT DOCUMENTS

| | | | | |
|---|---|---|---|---|
| DE | 102020111495 A1 * | 10/2021 | ............. | B60K 37/20 |
| EP | 3146223 | 6/2019 | | |

* cited by examiner

*Primary Examiner* — Jason S Daniels
(74) *Attorney, Agent, or Firm* — Lorne Forsythe; Hanley, Flight and Zimmerman, LLC

(57) ABSTRACT

An example apparatus includes a steering column movable between an operating position and a stowed position, a first shroud coupled to the steering column, the first shroud positioned around a lower portion of the steering column, and a second shroud positioned around an upper portion of the steering column, the second shroud including a first portion coupled to at least one of the first shroud or the steering column, and a second portion having an adjustable displacement relative to the first portion.

20 Claims, 10 Drawing Sheets

FORWARD

REARWARD

SHROUDS FOR STOWABLE STEERING COLUMNS

FIELD OF THE DISCLOSURE

This disclosure relates generally to steering column shrouds and, more particularly, to shrouds for stowable steering columns.

BACKGROUND

Vehicles often include a shroud to cover a portion of a steering column that protrudes forward of an instrument panel towards the driver. In some instances, the steering column is movable to provide a driver more space during ingress and egress while providing a comfortable distance between the driver and the steering wheel when the vehicle is driven.

SUMMARY

An example apparatus disclosed herein includes a steering column movable between an operating position and a stowed position, a first shroud coupled to the steering column, the first shroud positioned around a lower portion of the steering column, and a second shroud positioned around an upper portion of the steering column. The second shroud includes a first portion coupled to at least one of the first shroud or the steering column, and a second portion having an adjustable displacement relative to the first portion.

An example disclosed herein includes a lower shroud to be coupled to a steering column, the lower shroud to move with the steering column, and an upper shroud to be positioned around an upper portion of the steering column. The upper shroud includes a first portion to be coupled to at least one of the lower shroud or the steering column, the first portion to move with the steering column, a track coupled to the first portion, and a second portion slidably positioned in the track, the second portion to slide toward a rear end of the track when the steering column moves from a stowed position to an operating position.

An example apparatus disclosed herein includes an instrument panel, a steering column movable between a first position and a second position, an increased portion of the steering column to extend out of the instrument panel in the first position relative to the second position, a lower shroud coupled to the steering column, the lower shroud to move with the steering column when the steering column moves between the first position and the second position, and an upper shroud. The upper shroud includes a first part coupled to at least one of the steering column or the lower shroud, and a second part including a portion that overlaps the first part when the steering column is in the second position, the portion of the second part exposed to a cabin of a vehicle when the steering column is in the first position.

BRIEF DESCRIPTION OF THE DRAWINGS

In general, the same reference numbers will be used throughout the drawing(s) and accompanying written description to refer to the same or like parts. The figures are not to scale.

Figure 1:
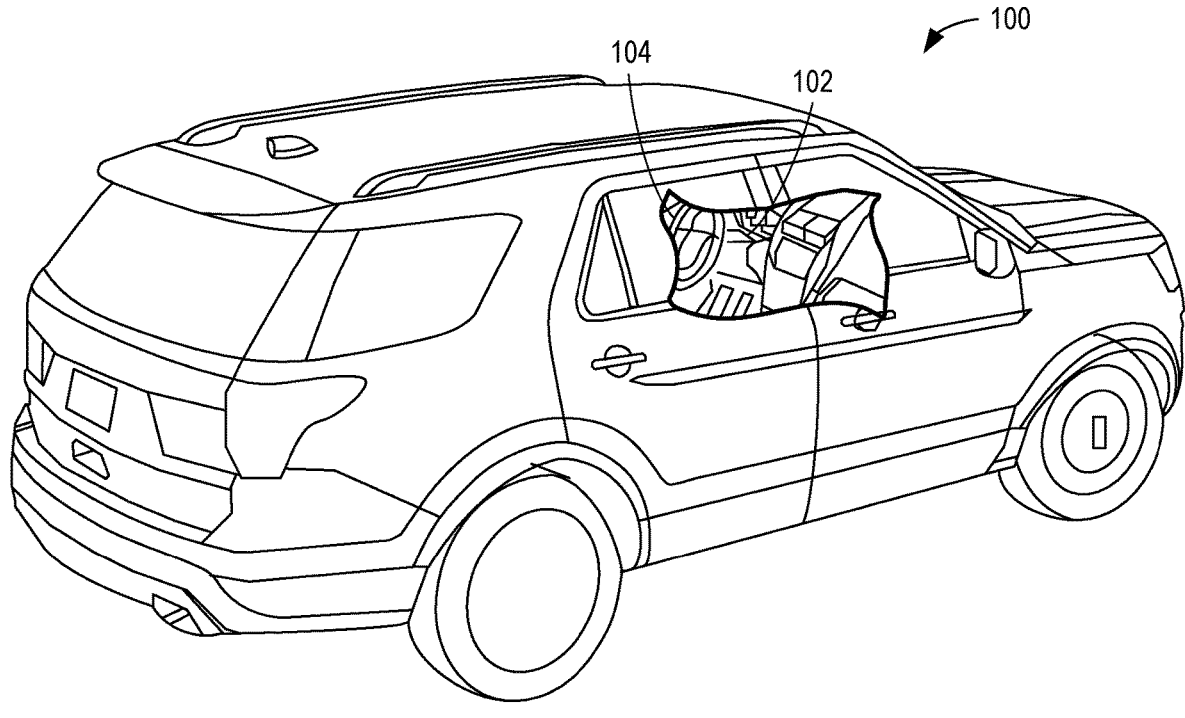
FIG. 1 depicts a vehicle in which examples disclose herein can be implemented.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein in the context of describing the position and/or orientation of a first object relative to a second object, the term "substantially parallel" encompasses the term parallel and more broadly encompasses a meaning whereby the first object is positioned and/or oriented relative to the second object at an absolute angle of no more than ten degrees (10°) from parallel. For example, a first axis that is substantially parallel to a second axis is positioned and/or oriented relative to the second axis at an absolute angle of no more than ten degrees (10°) from parallel.

DETAILED DESCRIPTION

Shrouds for stowable steering columns are disclosed. A steering column can move a steering wheel towards or away from an operator (e.g., away from or towards an instrument panel) based on operating conditions and/or a preference of the operator. Specifically, the steering column can move the steering wheel closer to an instrument panel in a stowed position to provide an operator with more room when the vehicle is not being driven. For example, the stowed position provides more room for ingress and egress as well as for activities, such as working and/or eating, in the driver's seat while the vehicle is off or in park. Moreover, the steering column can move the steering wheel away from the instrument panel and towards the driver (e.g., to an operating position) when the operator is ready to drive. As such, the movement of the steering column and the steering wheel can help provide additional room when needed while also enabling the operator to control the steering wheel in a comfortable position while driving.

In recent years, steering columns have been able to move the steering wheel closer to instrument panel, which provides more room for the operator when in the stowed position and improves an aesthetic of an interior of the vehicle. However, the additional space provided in the stowed position also requires the steering column to move the steering wheel an increased distance to the operating position. As a result, a length of a flexible cover (e.g., a gap hider, a vinyl material) that is coupled to a steering column shroud and the instrument panel has increased to enable coverage of the steering column across the increased distance. However, the increased length of the flexible cover causes the flexible cover to fold over itself and bunch up when the steering column moves to the stowed position. When in the folded, bunched position, the flexible cover downgrades an aesthetic of the interior of the vehicle. Additionally, as the steering column cycles between the stowed position and the operating position, the folded, bunched displacement of the flexible cover can result in creases, cracks, and tears over time, which can expose the steering column between the steering column shroud and the instrument panel and negatively impact the aesthetic of the interior of the vehicle.

Examples disclosed herein minimize or otherwise reduce movement of the flexible cover as the steering column moves between the stowed position and the operating position. As a result, examples disclosed herein minimize or otherwise reduce wear encountered by the flexible cover throughout the lifespan of a vehicle and, in turn, maintain an aesthetic associated with the vehicle interior. To obtain this advantage, example steering column shrouds disclosed herein include an upper shroud that has a first part fixed to the steering column and a second part that has an adjustable displacement relative the steering column and the first part. The flexible cover is coupled to an instrument panel (e.g., a register carrier) and an edge of the second part of the upper shroud closest to the instrument panel.

When the steering column is in the stowed position, the first part of the upper shroud overlaps a portion of the second part. As the steering column transitions from the stowed position to the operating position, the first part moves with the steering column and uncovers the portion of the second part. Specifically, the second part can be positioned in a track that is coupled to an inner wall of the first part, and the flexible cover can pull the second part towards an end of the track closest to the instrument panel as the first part moves away from the instrument panel. As a result, in the operating position, the first part of the upper shroud remains positioned over a same portion of the steering column while the second part of the upper shroud is positioned over a portion of the steering column previously inboard of the instrument panel. Thus, the second part encounters less movement than the first part and, thus, causes the flexible cover to encounter less movement while maintaining coverage of the entire steering column. As such, the steering column shroud minimizes or otherwise reduces bunching or folding of the flexible cover in the stowed position that would otherwise cause the flexible cover to crease, crack, and/or tear over time.

FIG. 1 illustrates an example vehicle 100 that can implement examples disclosed herein. The example vehicle 100 includes an example instrument panel 102 (e.g., an register carrier) and an example steering wheel 104. The steering wheel 104 is movable (e.g., translatable, slidable, etc.) between a first position (e.g., a stowed position) and a second position (e.g., an operating position). Specifically, the steering wheel 104 is positioned closer to the instrument panel 102 in the stowed position to provide more room for a driver to enter and exit the vehicle 100 or perform activities, such as reading, writing, or eating, when the vehicle 100 is parked. Moreover, the steering wheel 104 is positioned further from the instrument panel 102 and closer to a rear of the vehicle 100 in the operating position to enable the driver to operate (e.g., rotate) the steering wheel 104 while in a comfortable position.

Figure 2:
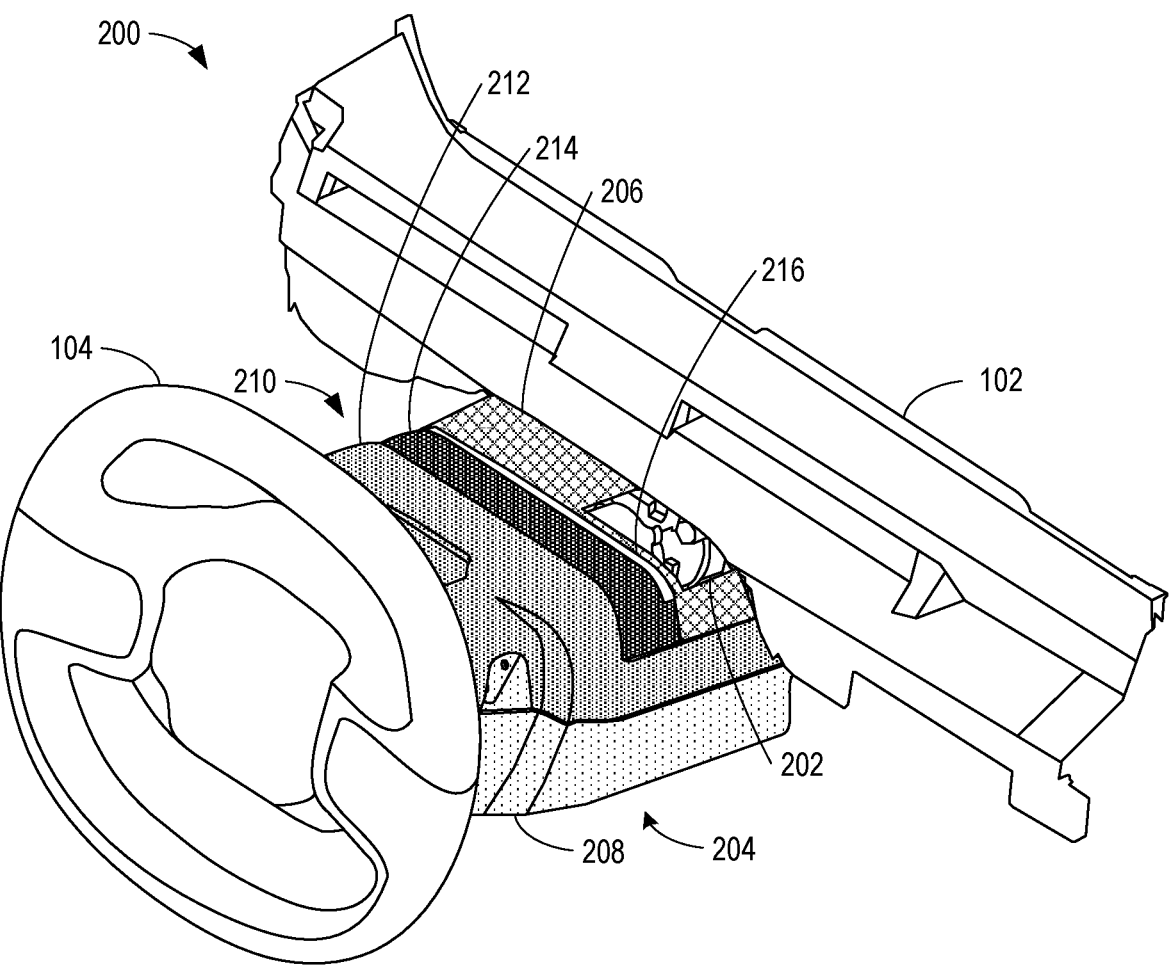
FIG. 2 illustrates an example steering wheel environment of the vehicle of FIG. 1 having an example stowable steering column shroud in accordance with the teachings disclosed herein.

FIG. 2 illustrates an example environment 200 (e.g., a steering wheel environment) in the vehicle 100 of FIG. 1. In the illustrated example, the environment 200 includes the instrument panel 102, the steering wheel 104, an example steering column 202, an example steering column shroud 204, and an example flexible cover 206 (e.g., a gap hider, a vinyl steering column cover, etc.). The steering column shroud 204 includes a lower shroud 208 and an upper shroud 210. The upper shroud 210 includes a first portion 212 (e.g., a first part) and a second portion 214 (e.g., a second part). In some examples, the first portion 212 of the upper shroud 210 is coupled to the lower shroud 208.

In the illustrated example of FIG. 2, the steering column shroud 204 is positioned around at least a portion of the steering column 202. Specifically, the lower shroud 208 is positioned around a bottom portion of the steering column 202, and the upper shroud 210 is positioned around a top portion of the steering column 202. The lower shroud 208 and the first portion 212 of the upper shroud 210 are coupled to the steering column 202. As such, the lower shroud 208 and the first portion 212 of the upper shroud 210 move with the steering column 202. The second portion 214 of the upper shroud 210 has an adjustable displacement (e.g., is moveable) relative to the first portion 212.

The flexible cover 206 is coupled to the instrument panel 102 and the second portion 214 of the upper shroud 210. Specifically, the flexible cover 206 is coupled to the second portion 214 of the upper shroud 210 at a front edge 216 of the second portion 214. As such, the flexible cover 206 can cover an upper portion of the steering column 202 that is between the upper shroud 210 and the instrument panel 102. In the illustrated example of FIG. 2, a portion of the flexible cover 206 has been omitted to show the steering column 202.

The steering column 202 is operatively coupled to the steering wheel 104 and extends through the instrument panel 102 towards a front of the vehicle 100. The steering column 202 enables a driver to turn the wheels of the vehicle 100 via the steering wheel 104. For example, the steering column 202 can convert a rotation of the steering wheel 104 to a rotation of the wheels of the vehicle 100 through movement of a rack and pinion, a recirculating ball, a worm and sector, or any other steering gears operatively coupled to an end of the steering column 202 opposite the steering wheel 104.

In the illustrated example of FIG. 2, the steering column 202 moves (e.g., translates, telescopes, etc.) towards or away from a front of the vehicle 100 such that the steering wheel 104 moves towards or away from the instrument panel 102. That is, when an operator is driving the vehicle 100, the steering column 202 can move the steering wheel 104 further from the instrument panel 102 (e.g., outboard) such that the operator can control the steering wheel 104 while in a comfortable position. Further, when the operator is not driving the vehicle 100 (e.g., during ingress and egress, when the operator is idle in the driver's seat, etc.), the steering column 202 can move the steering wheel 104 closer to the instrument panel 102 (e.g., inboard) to reduce crowding caused by the steering wheel 104 and improve comfort of the operator.

In the illustrated example of FIG. 2, the lower shroud 208 and the first portion 212 of the upper shroud 210 move with the steering column 202 when the steering column 202 moves the steering wheel 104 between the operating position and the stowed position. As such, when the steering wheel 104 moves from the operating position to the stowed position, the lower shroud 208 and the first portion 212 of the upper shroud 210 move towards the instrument panel 102. Similarly, when the steering wheel 104 moves from the stowed position to the operating position, the lower shroud 208 and the first portion 212 of the upper shroud 210 move away from the instrument panel 102.

In the illustrated example of FIG. 2, when the steering wheel 104 moves from the stowed position to the operating position, the second portion 214 of the upper shroud 210 moves less than the first portion 212 of the upper shroud 210. Specifically, the flexible cover 206 pulls the second portion 214 of the upper shroud 210 towards the instrument panel 102 while the first portion 212 of the upper shroud 210 moves away from the instrument panel 102. As a result, the second portion 214 of the upper shroud 210 at least partially slides out from underneath the first portion 212. In some other examples, the first portion 212 of the upper shroud 210 slides out from underneath the second portion 214 when the steering wheel 104 moves from the stowed position to the operating position. Accordingly, a first area of the second portion 214 of the upper shroud 210 overlaps (e.g., is positioned over, is positioned under, etc.) the first portion 212 when the steering wheel 104 is in the stowed position. Further, a second area of the second portion 214 of the upper shroud 210 that is smaller than the first area overlaps (e.g., is positioned over, is positioned under, etc.) the first portion 212 when the steering wheel 104 is in the operating position.

Advantageously, the reduced movement of the second portion 214 of the upper shroud 210 reduces a variance in the area that the flexible cover 206 is to cover when in the operating position compared to the stowed position. In some examples, the reduced variance in the area to be covered enables a length of the flexible cover 206 to be reduced. Additionally, the reduced variance in the area to be covered minimizes or otherwise reduces movement of an end of the flexible cover 206 coupled to the leading edge 216 of the second portion 214 of the upper shroud 210. In turn, the reduced movement of the end of the flexible cover 206 reduces folds in the flexible cover 206 that would otherwise occur in the stowed position while still enabling the flexible cover 206 to be positioned over a void between the second portion 214 of the upper shroud 210 and the instrument panel 102 when in the operating position. As a result, by reducing movement of the end of flexible cover 206, the steering column shroud 204 helps prevent the flexible cover 206 from encountering creases, cracks, and/or tears that would otherwise result from cyclic folding or bunching as the steering wheel 104 moves between the operating position and the stowed position. Therefore, the steering column shroud 204 can maintain an original condition of the flexible cover 206 over a lifespan of the vehicle 100 while also allowing the steering wheel 104 to be positioned near the instrument panel 102 in the stowed position.

Figure 3:
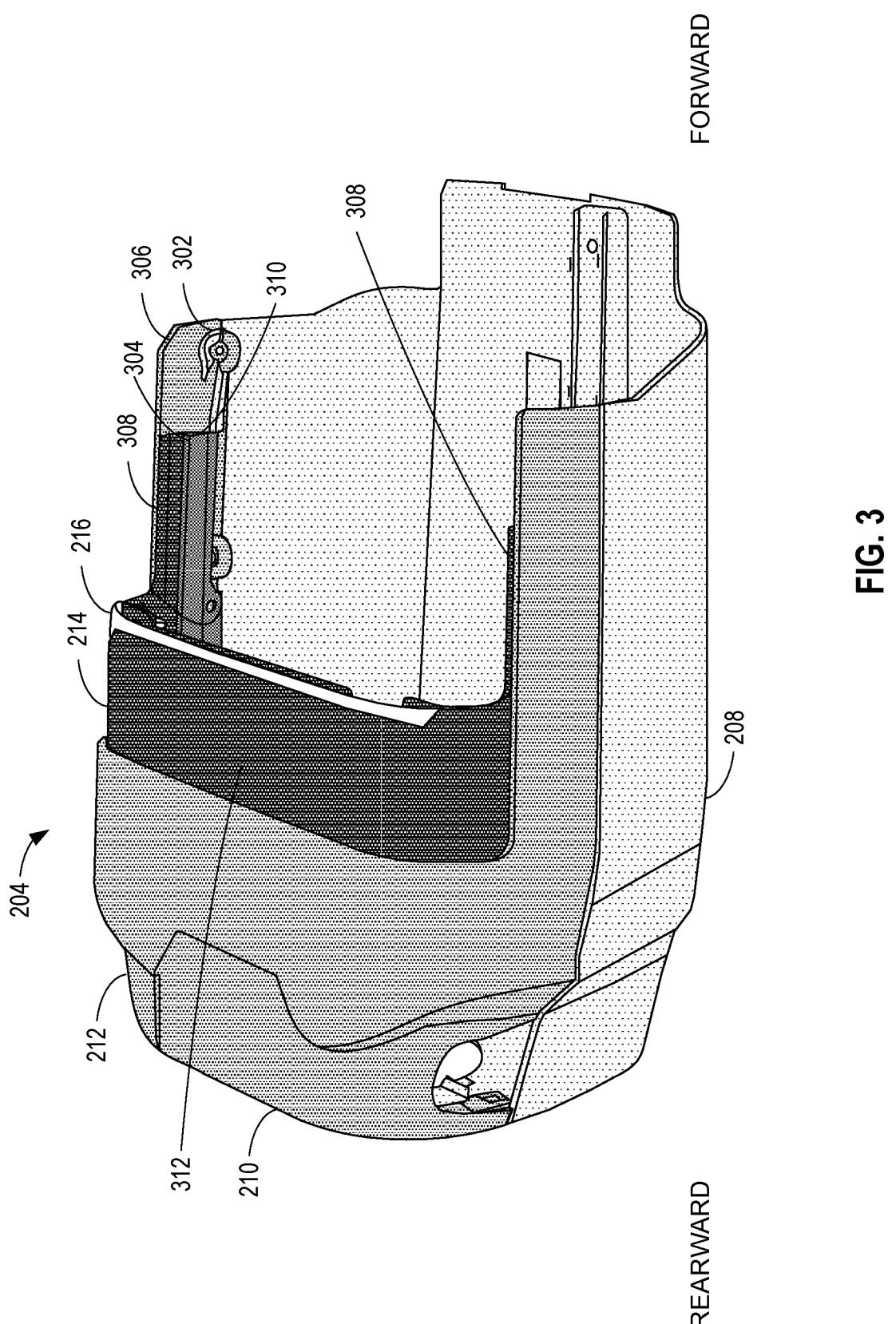
FIG. 3 illustrates a first view of the example stowable steering column shroud of FIG. 2.

FIG. 3 illustrates a first view of the steering column shroud 204. As depicted, the upper shroud 210 is coupled to the lower shroud 208 via couplings 302. In the illustrated example of FIG. 3, the upper shroud 210 includes tracks 304 coupled to the first portion 212 of the upper shroud 210. Specifically, the tracks 304 are positioned against an inner surface 306 on opposite sides of the first portion 212. Alternatively, the tracks 304 can be integral with the first portion 212 of the upper shroud 210. In some other examples, the tracks 304 are coupled to the instrument panel 102 (FIGS. 1 and 2).

In the illustrated example of FIG. 3, the second portion 214 of the upper shroud 210 includes legs 308 that are movably (e.g., slidably, translatably, etc.) positioned in the track 304. Specifically, the legs 308 translate towards a front end 310 of the track 304 when the steering column shroud 204 is in the operating position. Further, the legs 308 translate towards a rear end (not shown) of the track 304 when the steering column shroud 204 is in the stowed position. Further, the second portion 214 of the upper shroud 210 includes a horizontal section 312 that connects the legs 308 and is positioned over the steering column 202 (FIG. 2).

During operation, the lower shroud 208 and the first portion 212 and the upper shroud 210 move forward (e.g., towards a front of the vehicle 100 (FIG. 1)) when the steering wheel 104, the steering column 202, and the steering column shroud 204 move from the operating position to the stowed position. In turn, the legs 308 translate in the track 304 towards a rear end (not shown) and an area of the horizontal section 312 (e.g., an area rearward of the front edge 216 to which the flexible cover 206 (FIG. 2) couples) slides underneath the first portion 212 of the upper shroud 210. In other words, the first portion 212 of the upper shroud 210 moves forward over the second portion 214 and the legs 308 slide in the track 304 as the first portion 212 moves. In some examples, compression in the flexible cover 206 (FIG. 2) helps push the second portion 214 rearward to cause the legs 308 to slide in the track 304. In some examples, the first portion 212 of the upper shroud 210 moves a greater distance forward than the second portion 214 of the upper shroud 210 as the steering column shroud 204 moves from the operating position to the stowed position.

Further, when the steering wheel 104, the steering column 202, and the steering column shroud 204 move from the stowed position to the operating position, the lower shroud 208 and the first portion 212 and the upper shroud 210 move rearward (e.g., towards a rear of the vehicle 100, further into the cabin of the vehicle 100). In turn, the legs 308 translate towards the front end 310 of the track 304 and the area of the horizontal section 312 slides out from underneath the first portion 212 of the upper shroud 210. In some examples, tension in the flexible cover 206 helps pull the second portion 214 of the upper shroud 210 towards the instrument panel 102 (e.g., towards a front of the vehicle 100) as the first portion 212 moves away front the instrument panel 102.

Figure 4:
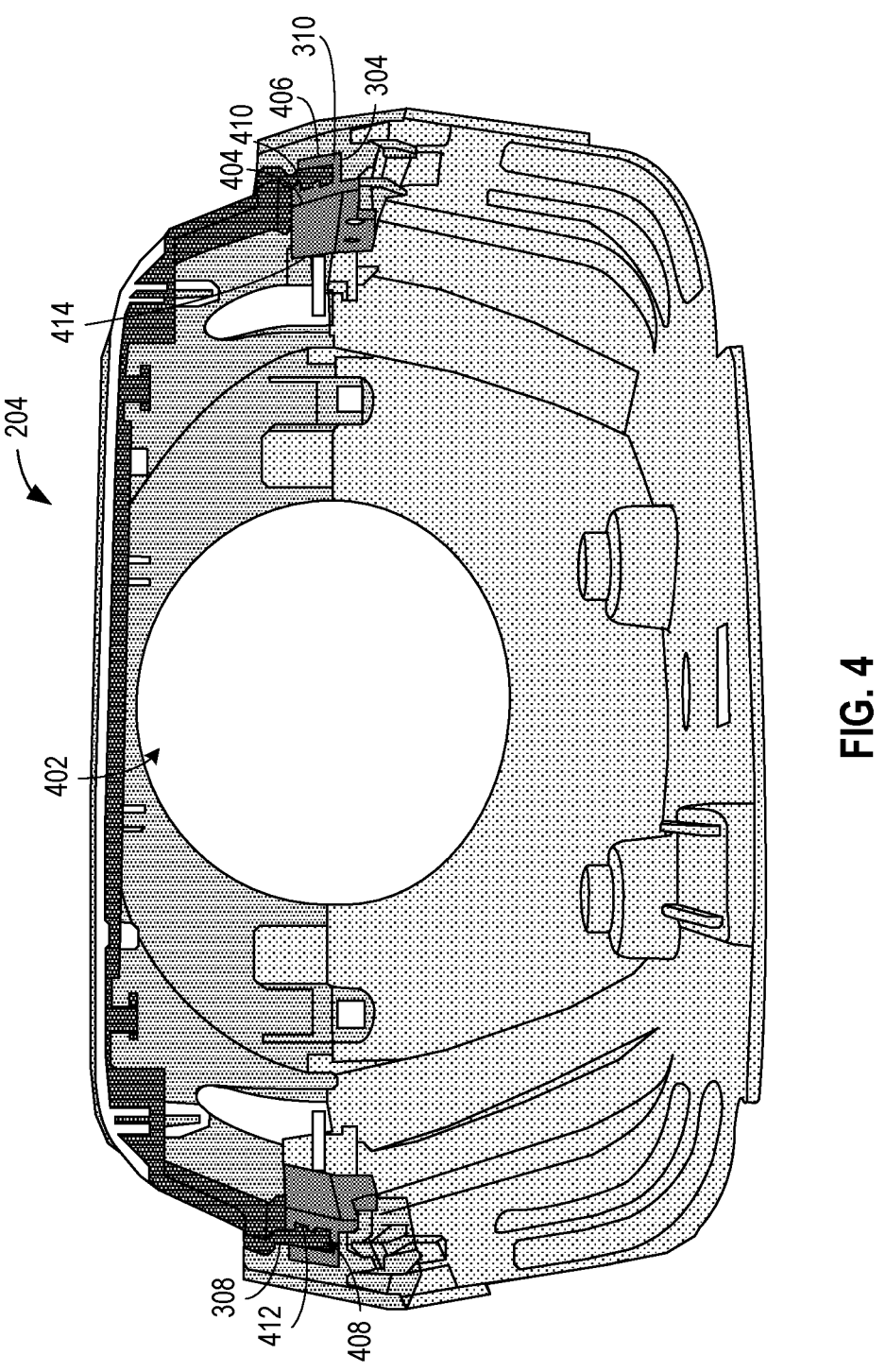
FIG. 4 illustrates a second view of the example stowable steering column shroud of FIGS. 2 and 3.

FIG. 4 illustrates a second (e.g., a front-to-rear) view of the steering column shroud 204. In the illustrated example of FIG. 4, the lower shroud 208 and the first portion 212 of the upper shroud 210 define an opening 402 through which the steering column 202 (FIG. 2) extends to couple to the steering wheel 104. In the illustrated example of FIG. 4, the track 304 includes an inner wall 404 and an outer wall 406 that define a slot 408 therebetween. The legs 308 of the second portion 214 of the upper shroud 210 are positioned in the slot 408.

In the illustrated example of FIG. 4, the track 304 includes first ridges 410 (e.g., protrusions, lifted surfaces, etc.) that extend from the inner wall 404 into the slot 408. Additionally, the legs 308 include second ridges 412 that extend towards the inner wall 404. In some other examples, the first ridges 410 extend from the outer wall 406 into the slot 408. In such examples, the second ridges 412 extend towards the outer wall 406.

In the illustrated example of FIG. 4, the second ridges 412 are positioned below a top one of the first ridges 410. As such, the top one of the first ridges 410 can prevent the second ridges 412 from escaping out of a top of the slot 408 as a result of an upward force that the second portion 214 of the upper shroud 210 encounters when pulled towards the front end 310 of the track 304 by the flexible cover 206. In some examples, the track 304 and/or the second portion 214 of the upper shroud 210 includes a self-lubricating material (e.g., polytetrafluoroethylene, poly ether ether ketone (PEEK), etc.) to help the legs 308 move in the slot 408 between the front end 310 and a rear end 414 of the track 304. In some examples, a clearance (e.g., 0.1 mils, 0.5 mils, 2.0 mils, etc.) is defined between the legs 308 and the inner and outer walls 404, 406 to help reduce a force required to push or pull the second portion 214 of the upper shroud 210 towards the front end 310 or the rear end 414 of the track 304. Alternatively, the track 304 and/or the legs 308 can include rollers to help the legs 308 move in the slot 408.

Figure 5:
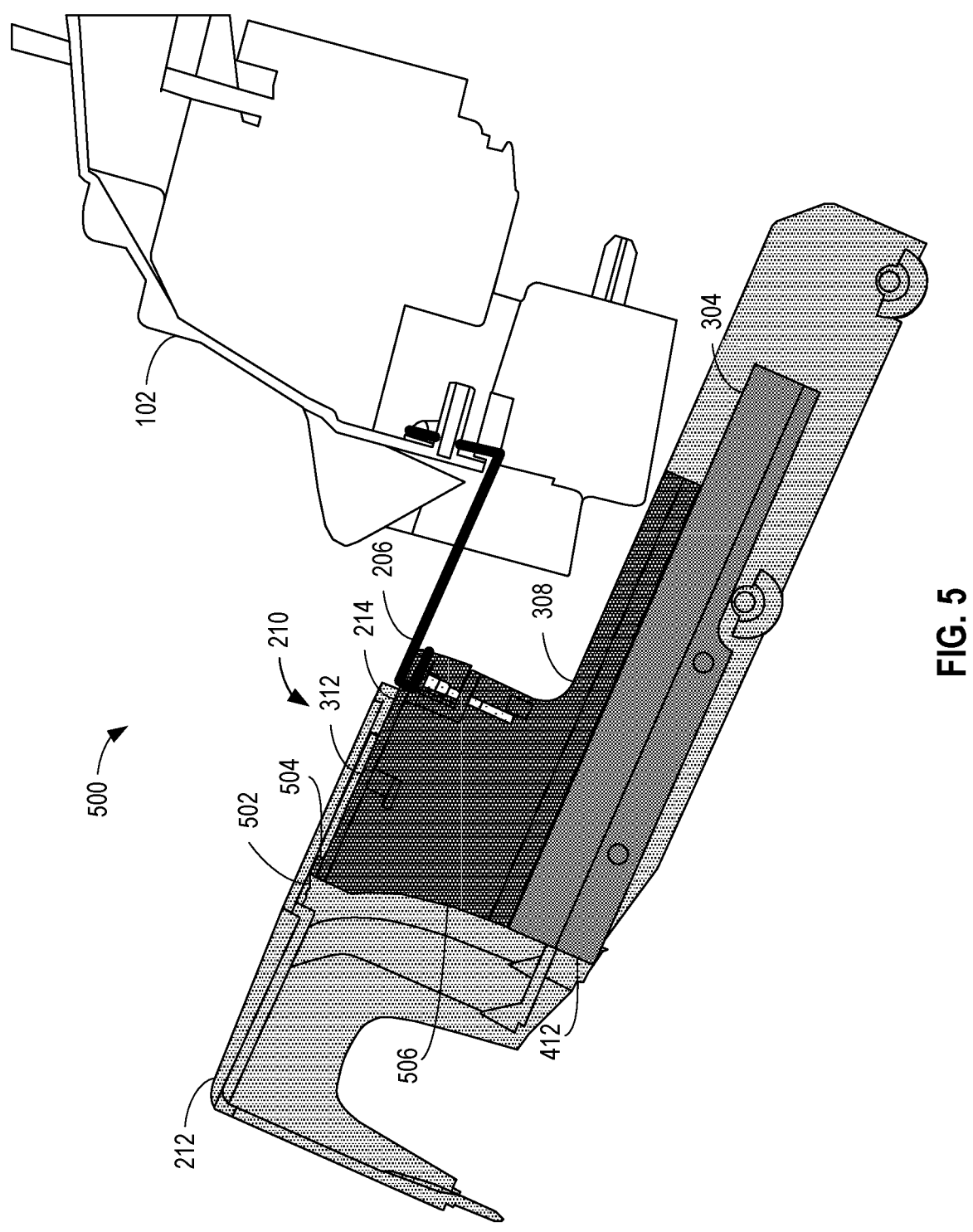
FIG. 5 illustrates a cross-sectional view of an example upper portion of the example stowable steering column shroud of FIGS. 2, 3, and 4 in an example stowed position.

FIG. 5 illustrates a cross-sectional view of the upper shroud 210 in an example stowed position 500. Because the first portion 212 of the upper shroud 210 is fixed to the steering column 202 (FIG. 2), the first portion 212 moves towards the instrument panel 102 as the steering column 202 translates (e.g., telescopes) inboard into the instrument panel 102. Further, as the first portion 212 moves toward the instrument panel 102, a compression of the flexible cover 206 can push the second portion 214 towards the rear end 414 of the track 304. In turn, the first portion 212 of the upper shroud 210 is positioned over an increased area of the horizontal section 312 of the second portion 214 and a length of the upper shroud 210 is reduced to enable the steering wheel 104 (FIGS. 1 and 2) to move closer to the instrument panel 102 and, thus, provide more room for the driver in the stowed position 500.

In the illustrated example of FIG. 5, the first portion 212 of the upper shroud 210 includes a first stop 502 (e.g., a first wedge, a first projection, a first rim, etc.), and the second portion 214 of the upper shroud 210 includes a second stop 504 (e.g., a second wedge, a second projection, a second rim, etc.). The first stop 502 protrudes from a top of the inner surface 306 of the first portion 212 of the upper shroud 210. The second stop 504 is positioned at a top of a rear edge 506 of the second portion 214 of the upper shroud 210. As such, the second stop 504 can contact the first stop 502 to prevent the legs 308 of the second portion 214 of the upper shroud 210 from moving out of the track 304. In some other examples, the first stop 502 protrudes from a sidewall of the inner surface of the first portion, and the second stop 504 protrudes from a sidewall of the second portion 214. Additionally or alternatively, the second stop 504 can be positioned forward of the rear edge 506, and the rear edge 506 can at least partially extend past the first stop 502 when in the stowed position 500.

Figure 6:
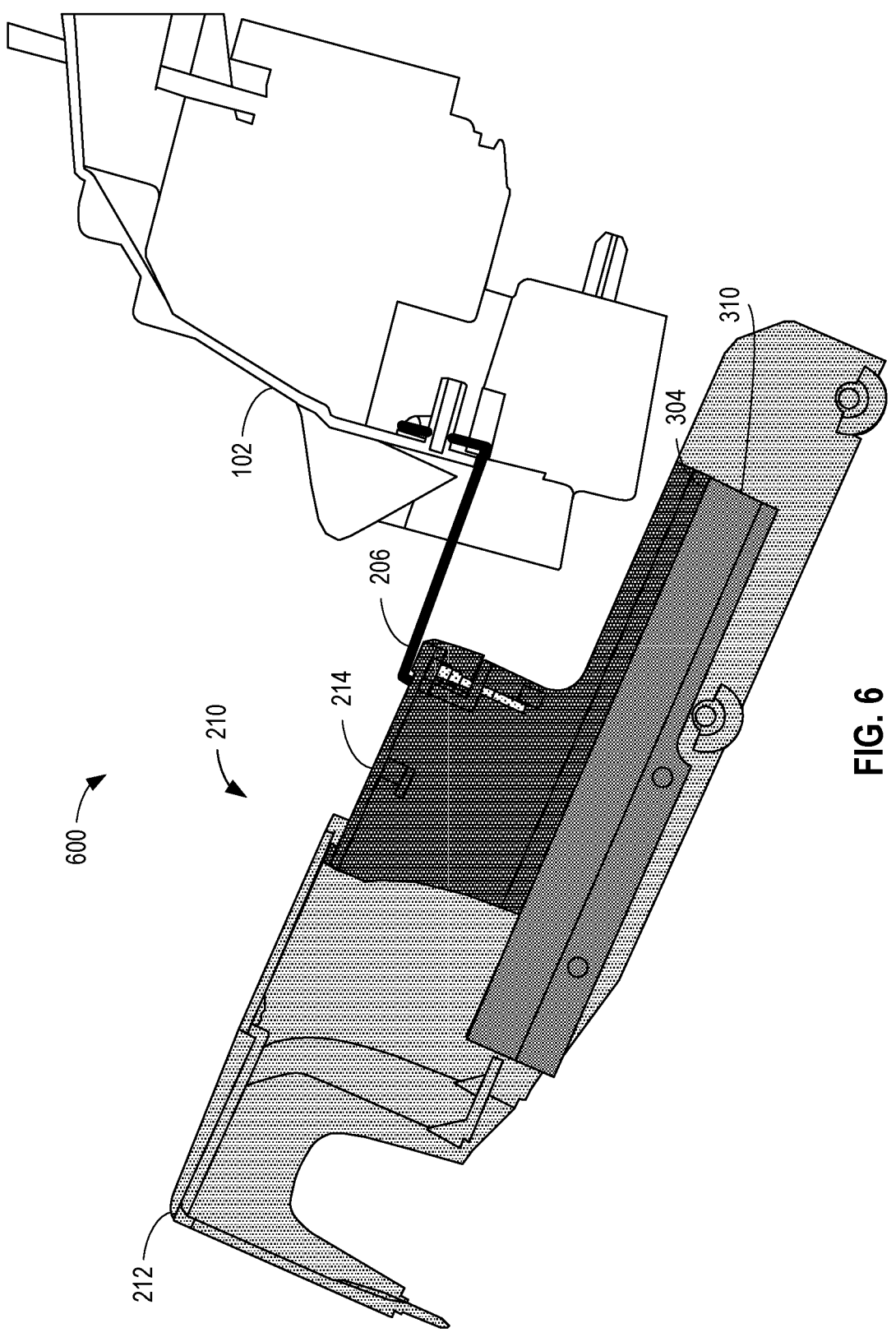
FIG. 6 illustrates a cross-sectional view of an example upper portion of the example stowable steering column shroud of FIGS. 2, 3, and 4 in an example operating position.

FIG. 6 illustrates a cross-sectional view of the upper shroud 210 in an example operating position 600. As the steering column (FIG. 2) translates outboard from the instrument panel 102, the first portion 212 of the upper shroud 210 moves away from the instrument panel 102 and towards a driver. Further, as the first portion 212 moves away from the instrument panel 102, a tension in the flexible cover 206 can pull the second portion 214 of the upper shroud 210 towards the front end 310 of the track 304. As a result, the first portion 212 of the upper shroud 210 is positioned over a reduced area of the second portion 214 and the length of the upper shroud 210 is increased to cover the increased distance that the steering column 202 protrudes from the instrument panel 102. In some examples, front edges 602 of the legs 308 are positioned rearward of the front end 310 of the track 304 to enable the operating position 600 to be comfortably positioned for an operator.

Figure 7A:
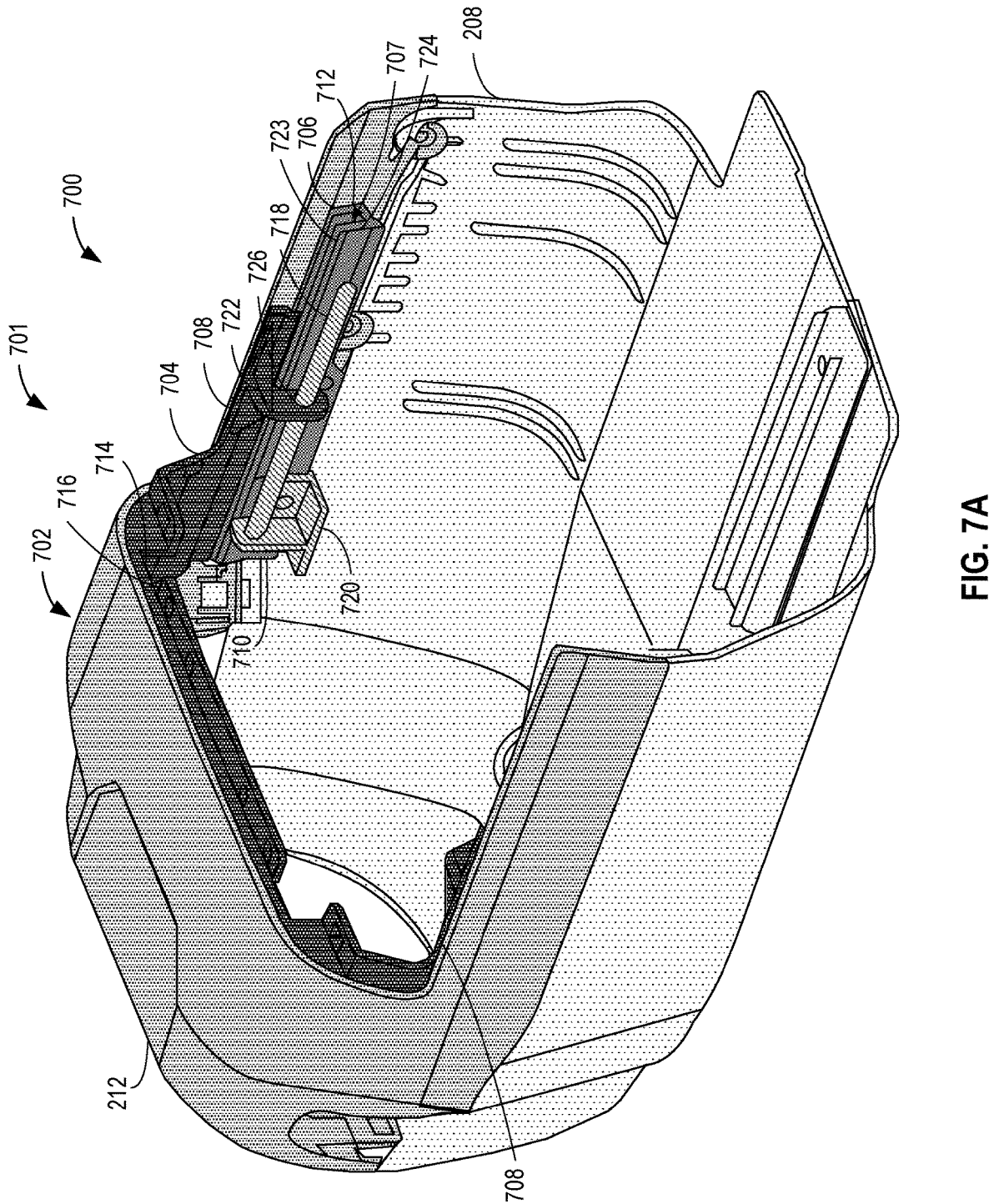
FIG. 7A illustrates a first view of another example stowable steering column shroud in accordance with the teachings disclosed herein.
Figure 7B:
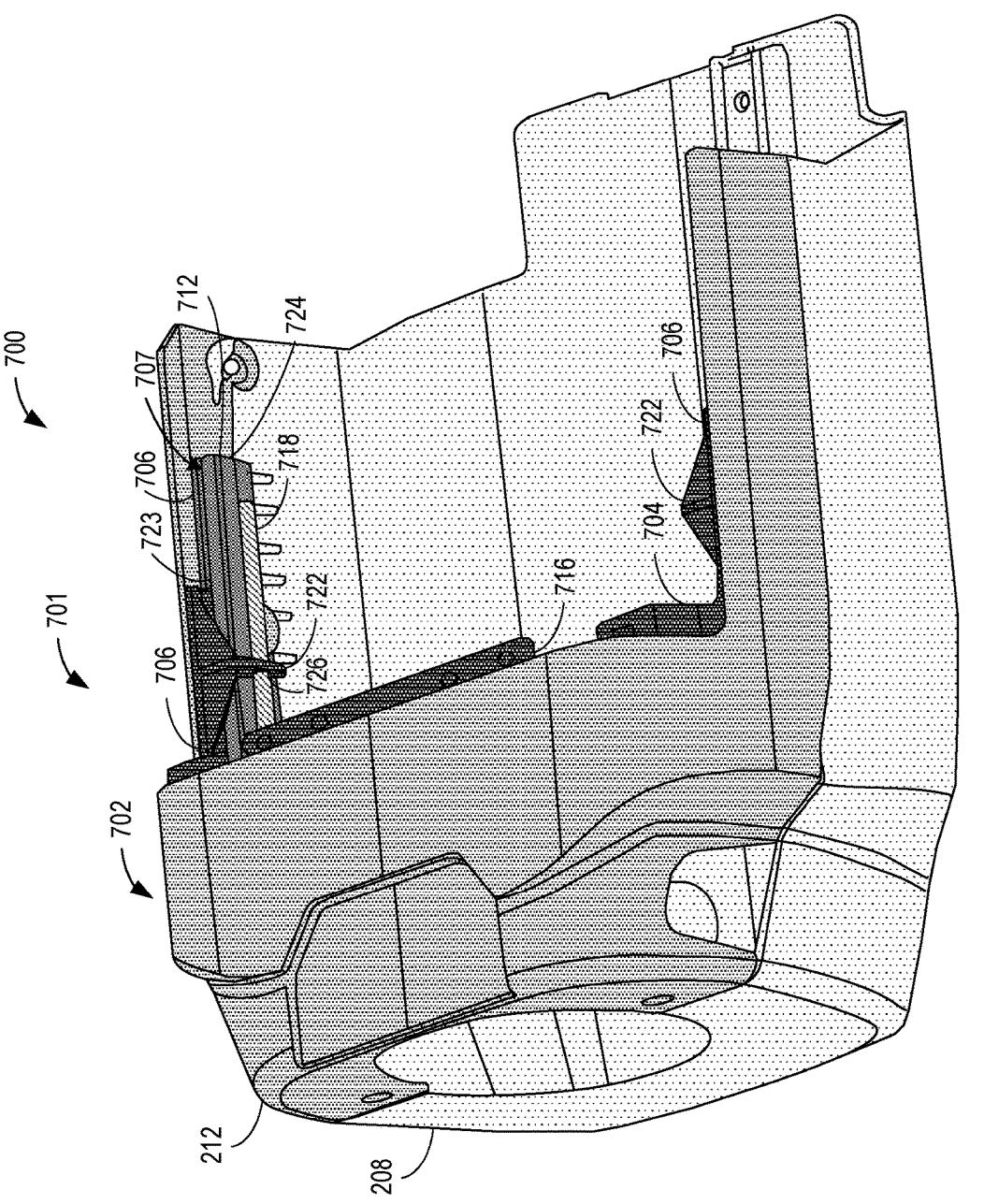
FIG. 7B illustrates a second view of the example stowable steering column shroud of FIG. 7A.

FIG. 7A illustrates a first view of another example steering column shroud 700 in an example stowed position 701. FIG. 7B illustrates a second view of the steering column shroud 700 in the stowed position 701. In the illustrated examples of FIGS. 7A-B, the steering column shroud 700 includes the lower shroud 208 of FIGS. 2-6 and an upper shroud 702. The upper shroud includes the first portion 212 of FIGS. 2-6 and another example second portion 704. The first portion 212 of the upper shroud 702 is coupled to the lower shroud 208. The first portion 212 of the upper shroud 702 and the lower shroud 208 can be positioned around and coupled to a stowable steering column (e.g., the steering column 202 of FIG. 2). As a result, the first portion 212 of the upper shroud 702 and the lower shroud 208 move with the stowable steering column as the stowable steering column moves further into or out of an instrument panel (e.g., the instrument panel 102 of FIGS. 1 and 2). Furthermore, the second portion 704 of the upper shroud 702 has an adjustable displacement (e.g., is moveable) relative to the first portion 212 and, thus, can move independently from the stowable steering column.

Similar to the steering column shroud 204 of FIGS. 2-6, the steering column shroud 700 includes a track 706 and the second portion 704 of the upper shroud 702 includes legs 708 that are movably (e.g., slidably, translatably, etc.) positioned in a slot 707 defined by the track 706. In the illustrated example of FIG. 7, the legs 708 are positioned at a rear end 710 of the track 706 as the associated steering column (not shown) is in a stowed position. When the steering column moves to an operating position, the legs 708 translate towards a front end 712 of the track, as discussed in association with FIGS. 8A-8B.

In the illustrated examples of FIGS. 7A-B, the second portion 704 of the upper shroud 702 includes a horizontal section 714 (e.g., the horizontal section 312 of FIGS. 3 and/or 5) that connects the legs 708 and is positioned over the associated steering column. In the illustrated example of FIGS. 7A-7B, the horizontal section 714 includes an edge 716 that can be coupled to a flexible cover (e.g., the flexible cover 206 of FIG. 2, a gap hider, a vinyl steering column cover, etc.) that covers an area between the instrument panel and the second portion 704 of the upper shroud 702. In the illustrated examples of FIGS. 7A-B, a region of the horizontal section 714 rearward of the edge 716 is positioned underneath the first portion 212 of the upper shroud 702. As a result, the region of the horizontal section 714 is positioned over an area of the associated steering column that is also covered by the first portion 212 of the upper shroud 702 when the associated steering column is in the stowed position. Advantageously, the overlap between the region of the horizontal section 714 and the first portion 212 of the upper shroud minimizes or otherwise reduces a difference in an area covered by the flexible cover between the stowed position and the operating position, which minimizes or otherwise reduces folding or bunching of the flexible cover when the associated steering column is in the stowed position. Thus, the flexible cover can endure an increased quantity of cycles between the stowed position and the operating position without encountering a creases and/or tears.

In the illustrated examples of FIGS. 7A-B, the steering column shroud 702 includes a guide rod 718. For example, the guide rod 718 can extend from a base 720 that is coupled to the track 706. In some examples, the base 720 is coupled to the lower shroud 208 and/or the first portion 212 of the upper shroud 702. In the illustrated examples of FIGS. 7A-B, the guide rod 718 is substantially parallel to the slot 707 defined by the track 706. In the illustrated examples of FIGS. 7A-B, the legs 708 include a body 722 that extends inward of the track 706 and downward past an upper edge 723 of an inner wall 724 of the track 706. In the illustrated examples of FIGS. 7A-B, the body 722 includes an aperture 726 (e.g., an opening, a hole, an orifice, etc.) through which the guide rod 718 extends. As a result, the guide rod 718 helps maintain a position of the legs 708 in the track 706 as the legs 708 slide between the rear end 710 and the front end 712 of the track 706.

Figure 8A:
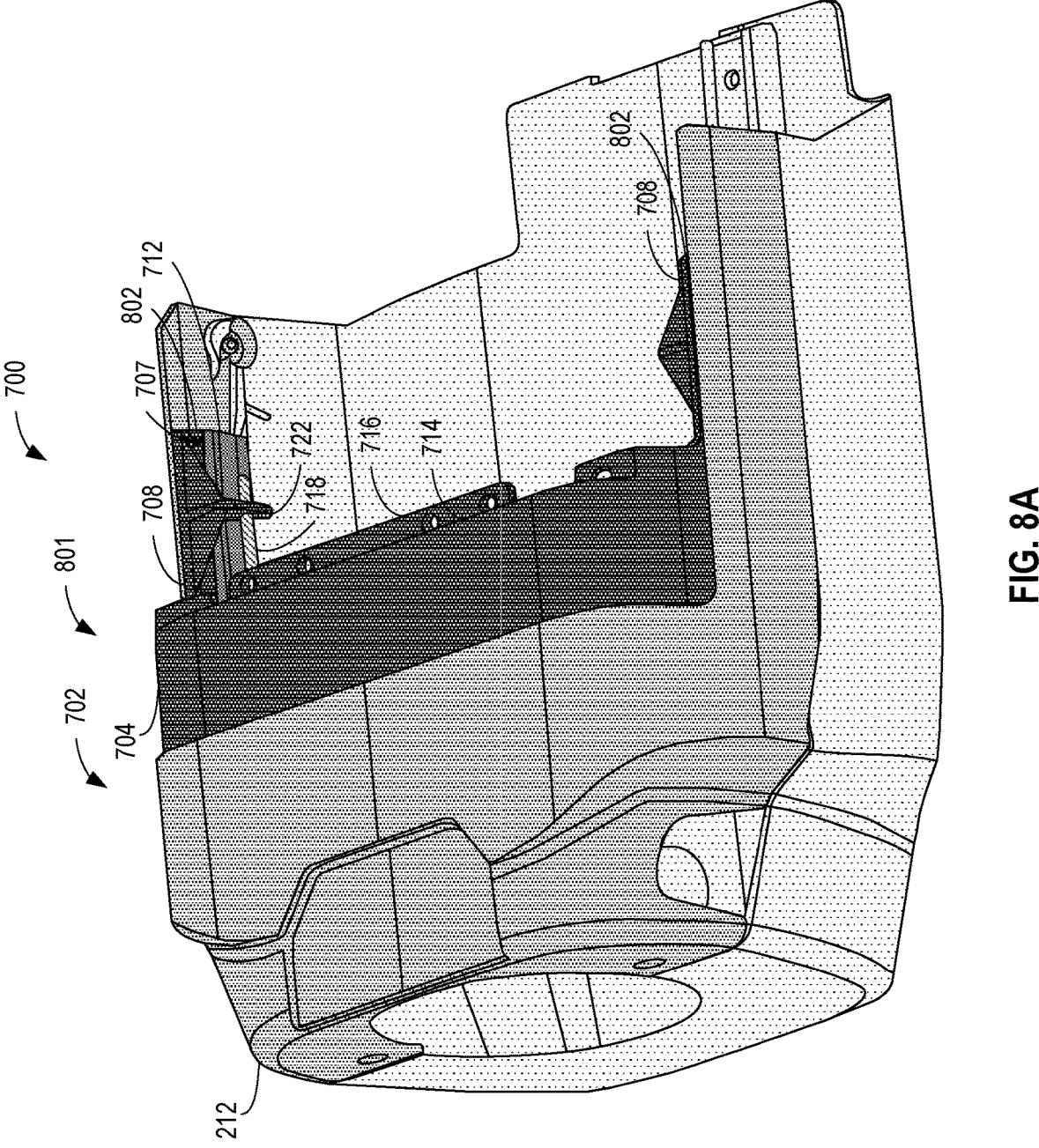
FIG. 8A illustrates a third view of the example stowable steering column shroud of FIGS. 7A and 7B.
Figure 8B:
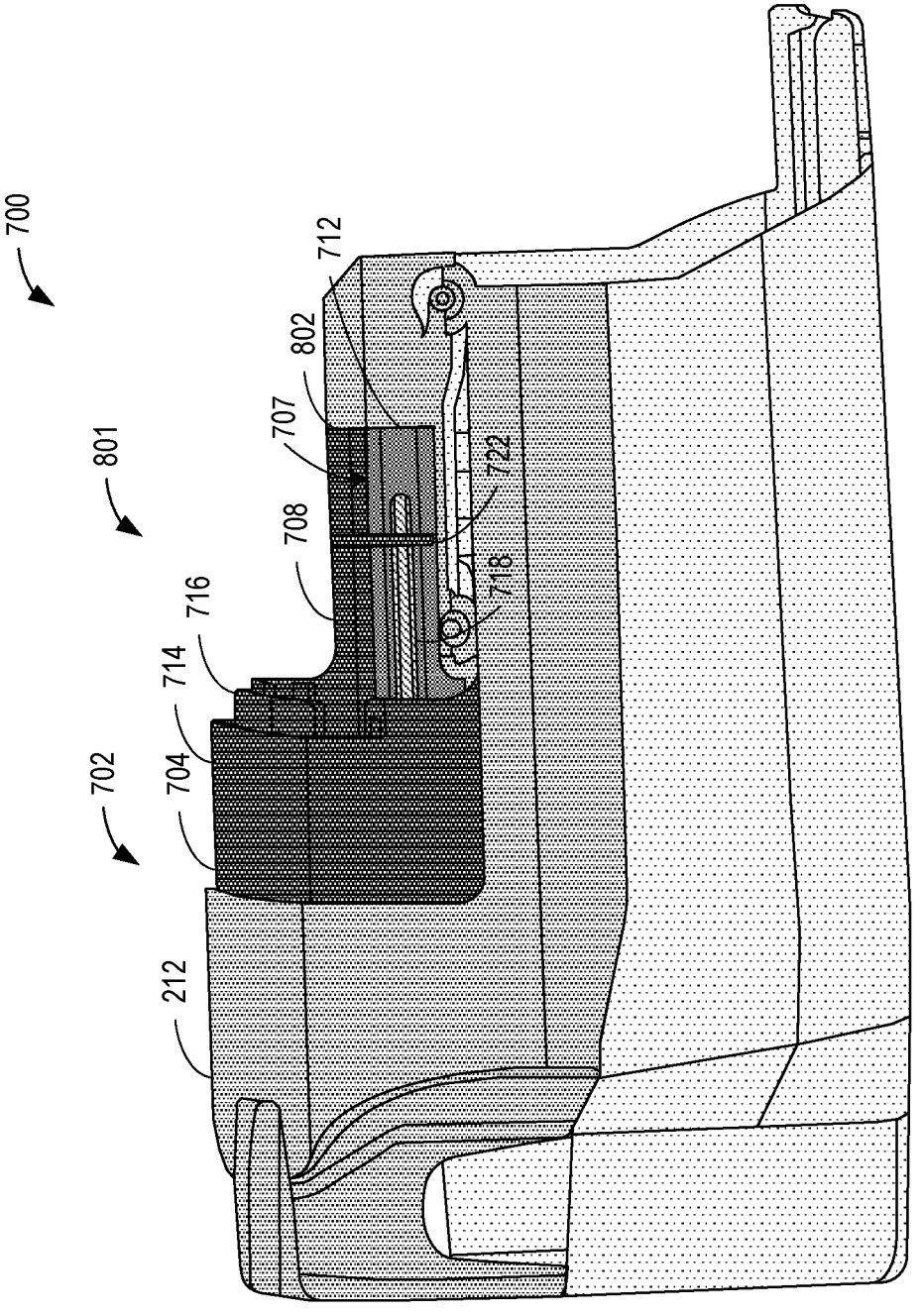
FIG. 8B illustrates a fourth view of the example stowable steering column shroud of FIGS. 7A, 7B, and 8A.

FIG. 8A illustrates a first view of the example steering column shroud 700 of FIGS. 7A-7B in an example operating position 801. FIG. 8B illustrates a second view of the steering column shroud in the operating position 801. In the illustrated example of FIGS. 8A-8B, the legs 708 of the second portion 704 of the upper shroud 702 are positioned at the front end 712 of the track 706. Specifically, tension in the flexible cover coupled to the edge 716 of the second portion 704 of the upper shroud 702 pulls the second portion 704 of the upper shroud 702 towards the instrument panel as the first portion 212 of the upper shroud 702 moves with the associated steering column away from the instrument panel (e.g., to an operating position). As a result, the legs 708 slide in the slot 707 with the body 722 sliding along the guide rod 718. Advantageously, the guide rod 718 helps prevent any upward force from the tension in the flexible cover from displacing the legs 708 out of the track 706. In turn, the region of the horizontal section 714 rearward of the edge 716 at least partially slides out from underneath the first portion 212 of the upper shroud 702 and is exposed in a cabin of the vehicle (e.g., the vehicle 100). Advantageously, a change in the area over which the flexible cover is positioned between the operating position and the stowed position is minimized or otherwise reduced as a result of the second portion 704 of the upper shroud 702 sliding out from underneath the first portion 212 of the upper shroud 702. In some examples, front edges 802 of the legs 708 are positioned rearward of the front end 712 of the track 706 in the operating position to provide more space between an associated steering wheel and an operator.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Example stowable steering column shrouds are disclosed herein. Further examples and combinations thereof include the following:

Example 1 includes an apparatus comprising a steering column movable between an operating position and a stowed position, a first shroud coupled to the steering column, the first shroud positioned around a lower portion of the steering column, and a second shroud positioned around an upper portion of the steering column, the second shroud including a first portion coupled to at least one of the first shroud or the steering column, and a second portion having an adjustable displacement relative to the first portion.

Example 2 includes the apparatus of example 1, further including an instrument panel, and a flexible cover coupled to the instrument panel and the second portion of the second shroud, the flexible cover to cover an opening between the instrument panel and the second portion of the second shroud.

Example 3 includes the apparatus of example 2, wherein the flexible cover is to pull the second portion of the second shroud towards the instrument panel when the steering column moves from the stowed position to the operating position.

Example 4 includes the apparatus of example 2, wherein the flexible cover includes a vinyl material.

Example 5 includes the apparatus of example 1, further including a track coupled to at least one of the first shroud or the first portion of the second shroud, the second portion of the second shroud at least partially disposed in the track.

Example 6 includes the apparatus of example 1, wherein the second portion of the second shroud is to at least partially move out from underneath the first portion when the steering column moves from the stowed position to the operating position.

Example 7 includes the apparatus of example 1, wherein the first portion of the second shroud moves a greater distance than the second portion of the second shroud when the steering column moves between the operating position and the stowed position.

Example 8 includes an apparatus comprising a lower shroud to be coupled to a steering column, the lower shroud to move with the steering column, and an upper shroud to be positioned around an upper portion of the steering column, the upper shroud including a first portion to be coupled to at least one of the lower shroud or the steering column, the first portion to move with the steering column, a track coupled to the first portion, and a second portion slidably positioned in the track, the second portion to slide toward a rear end of the track when the steering column moves from a stowed position to an operating position.

Example 9 includes the apparatus of example 8, wherein the second portion of the upper shroud includes a section covered by the first portion of the upper shroud when the steering column is in the stowed position, the section uncovered when the steering column is in the operating position.

Example 10 includes the apparatus of example 8, wherein the track includes an inner wall and an outer wall, the second portion positioned between the inner wall and the outer wall.

Example 11 includes the apparatus of example 10, wherein the track includes at least one ridge extending from the inner wall toward the outer wall.

Example 12 includes the apparatus of example 11, wherein the at least one ridge is at least one first ridge, wherein the second portion of the upper shroud includes at least one second ridge extending towards the inner wall of the track and positioned below the at least one first ridge.

Example 13 includes the apparatus of example 8, wherein the track includes a self-lubricating material.

Example 14 includes the apparatus of example 8, further including an instrument panel, and a vinyl material coupled to the instrument panel and the second portion of the upper shroud.

Example 15 includes an apparatus comprising an instrument panel, a steering column movable between a first position and a second position, an increased portion of the steering column to extend out of the instrument panel in the first position relative to the second position, a lower shroud coupled to the steering column, the lower shroud to move with the steering column when the steering column moves between the first position and the second position, and an upper shroud including a first part coupled to at least one of the steering column or the lower shroud, and a second part including a portion that overlaps the first part when the steering column is in the second position, the portion of the second part exposed to a cabin of a vehicle when the steering column is in the first position.

Example 16 includes the apparatus of example 15, further including a track coupled to the lower shroud or the first part of the upper shroud, the second part of the upper shroud slidable in the track.

Example 17 includes the apparatus of example 16, wherein the track includes a first wall and a second wall, and wherein the second part of the upper shroud includes a leg positioned between the first wall and the second wall.

Example 18 includes the apparatus of example 17, wherein the first wall of the track includes a first protrusion, and wherein the leg of the second part includes a second protrusion positioned under the first protrusion.

Example 19 includes the apparatus of example 15, further including a gap hider coupled to the instrument panel and to the second part of the upper shroud.

Example 20 includes the apparatus of example 19, wherein the gap hider is to pull the second part of the upper shroud towards the instrument panel when the steering column moves from the second position to the first position.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   a steering column movable between an operating position and a stowed position;
   a first shroud coupled to the steering column, the first shroud positioned around a lower portion of the steering column;
   a second shroud positioned around an upper portion of the steering column, the second shroud including:
   a first portion coupled to at least one of the first shroud or the steering column; and
   a second portion having an adjustable displacement relative to the first portion;
   an instrument panel; and
   a flexible cover coupled to the instrument panel and the second portion of the second shroud, the flexible cover to cover an opening between the instrument panel and the second portion of the second shroud.

2. The apparatus of claim 1, wherein the flexible cover is to pull the second portion of the second shroud towards the instrument panel when the steering column moves from the stowed position to the operating position.

3. The apparatus of claim 1, wherein the flexible cover includes a vinyl material.

4. The apparatus of claim 1, further including a track coupled to at least one of the first shroud or the first portion of the second shroud, the second portion of the second shroud at least partially disposed in the track.

5. The apparatus of claim 1, wherein the second portion of the second shroud is to at least partially move out from underneath the first portion when the steering column moves from the stowed position to the operating position.

6. The apparatus of claim 1, wherein the first portion of the second shroud moves a greater distance than the second portion of the second shroud when the steering column moves between the operating position and the stowed position.

7. An apparatus comprising:

a lower shroud to be coupled to a steering column, the lower shroud to move with the steering column; and an upper shroud to be positioned around an upper portion of the steering column, the upper shroud including:

a first portion to be coupled to at least one of the lower shroud or the steering column, the first portion to move with the steering column;

a track coupled to the first portion, the track including an inner wall and an outer wall; and a second portion slidably positioned in the track, the second portion positioned between the inner wall and the outer wall, the second portion to slide toward a rear end of the track when the steering column moves from a stowed position to an operating position.

8. The apparatus of claim 7, wherein the second portion of the upper shroud includes a section covered by the first portion of the upper shroud when the steering column is in the stowed position, the section uncovered when the steering column is in the operating position.

9. The apparatus of claim 7, wherein the track includes at least one ridge extending from the inner wall toward the outer wall.

10. The apparatus of claim 9, wherein the at least one ridge is at least one first ridge, wherein the second portion of the upper shroud includes at least one second ridge extending towards the inner wall of the track and positioned below the at least one first ridge.

11. The apparatus of claim 7, wherein the track includes a self-lubricating material.

12. An apparatus comprising:

a lower shroud to be coupled to a steering column, the lower shroud to move with the steering column; and an upper shroud to be positioned around an upper portion of the steering column, the upper shroud including:

a first portion to be coupled to at least one of the lower shroud or the steering column, the first portion to move with the steering column;

a track coupled to the first portion, the track including a self-lubricating material; and a second portion slidably positioned in the track, the second portion to slide toward a rear end of the track when the steering column moves from a stowed position to an operating position.

13. The apparatus of claim 12, wherein the track includes an inner wall and an outer wall, the second portion positioned between the inner wall and the outer wall.

14. An apparatus comprising:

a lower shroud to be coupled to a steering column, the lower shroud to move with the steering column;

an upper shroud to be positioned around an upper portion of the steering column, the upper shroud including:

a first portion to be coupled to at least one of the lower shroud or the steering column, the first portion to move with the steering column;

a track coupled to the first portion; and a second portion slidably positioned in the track, the second portion to slide toward a rear end of the track when the steering column moves from a stowed position to an operating position;

an instrument panel; and a vinyl material coupled to the instrument panel and the second portion of the upper shroud.

15. An apparatus comprising:

an instrument panel;

a steering column movable between a first position and a second position, an increased portion of the steering column to extend out of the instrument panel in the first position relative to the second position;

a lower shroud coupled to the steering column, the lower shroud to move with the steering column when the steering column moves between the first position and the second position;

an upper shroud including:

a first part coupled to at least one of the steering column or the lower shroud; and a second part including a portion that overlaps the first part when the steering column is in the second position, the portion of the second part exposed to a cabin of a vehicle when the steering column is in the first position, the second part of the upper shroud including a leg; and a track coupled to the lower shroud or the first part of the upper shroud, the second part of the upper shroud slidable in the track, the track including a first wall and a second wall, the leg positioned between the first wall and the second wall.

16. The apparatus of claim 15, wherein the first wall of the track includes a first protrusion, and wherein the leg of the second part includes a second protrusion positioned under the first protrusion.

17. An apparatus comprising:

an instrument panel;

a steering column movable between a first position and a second position, an increased portion of the steering column to extend out of the instrument panel in the first position relative to the second position;

a lower shroud coupled to the steering column, the lower shroud to move with the steering column when the steering column moves between the first position and the second position;

an upper shroud including:

a first part coupled to at least one of the steering column or the lower shroud; and a second part including a portion that overlaps the first part when the steering column is in the second position, the portion of the second part exposed to a cabin of a vehicle when the steering column is in the first position; and a gap hider coupled to the instrument panel and to the second part of the upper shroud.

18. The apparatus of claim 17, further including a track coupled to the lower shroud or the first part of the upper shroud, the second part of the upper shroud slidable in the track.

19. The apparatus of claim 18, wherein the track includes a first wall and a second wall, and wherein the second part of the upper shroud includes a leg positioned between the first wall and the second wall.

20. The apparatus of claim 17, wherein the gap hider is to pull the second part of the upper shroud towards the instrument panel when the steering column moves from the second position to the first position.

\* \* \* \* \*